United States Patent
Suzuki et al.

(10) Patent No.: US 8,305,472 B2
(45) Date of Patent: Nov. 6, 2012

(54) IMAGE CAPTURING SYSTEM (75) Inventors: Satoshi Suzuki, Hiratsuka (JP); Toru Koizumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 330 days.

(21) Appl. No.: 12/039,234

(22) Filed: Feb. 28, 2008

(65) Prior Publication Data

US 2008/0218627 A1 Sep. 11, 2008

(30) Foreign Application Priority Data

Mar. 6, 2007 (JP) ................................ 2007-056368

(51) Int. Cl.
*H04N 3/14* (2006.01)
*H04N 5/335* (2006.01)

(52) U.S. Cl. ........................ 348/296; 348/294

(58) Field of Classification Search .................. 348/296
See application file for complete search history.

(56) References Cited

U.S. PATENT DOCUMENTS

| | | | |
|---|---|---|---|
| 6,542,194 B1 * | 4/2003 | Juen | 348/367 |
| 6,847,026 B2 | 1/2005 | Koizumi et al. | 250/208.1 |
| 6,963,371 B2 | 11/2005 | Sakurai et al. | 348/301 |
| 6,987,685 B2 | 1/2006 | Koizumi et al. | 365/63 |
| 7,355,645 B2 | 4/2008 | Sakurai et al. | 348/308 |
| 7,593,047 B2 * | 9/2009 | Funakoshi et al. | 348/273 |
| 7,675,559 B2 * | 3/2010 | Kishi et al. | 348/294 |
| 2002/0154347 A1 | 10/2002 | Funakoshi et al. | |
| 2004/0196383 A1 | 10/2004 | Suzuki et al. | 348/223.1 |
| 2005/0195307 A1 | 9/2005 | Sakurai et al. | 348/308 |
| 2005/0225664 A1 * | 10/2005 | Matsumoto | 348/362 |
| 2006/0262209 A1 * | 11/2006 | Kishi | 348/297 |
| 2008/0012976 A1 | 1/2008 | Sakurai et al. | 348/301 |

FOREIGN PATENT DOCUMENTS

| | | |
|---|---|---|
| JP | 11-041523 | 2/1999 |
| JP | 2002-320235 A | 10/2002 |
| JP | 2004-038117 A | 2/2004 |
| JP | 2004-214925 A | 7/2004 |
| JP | 2006-352843 A | 12/2006 |
| JP | 2007-034042 A | 2/2007 |
| JP | 2007-267326 A | 10/2007 |

* cited by examiner

*Primary Examiner* — Anthony J Daniels
(74) *Attorney, Agent, or Firm* — Fitzpatrick, Cella, Harper & Scinto (57) ABSTRACT

An image capturing system includes an image sensor and a mechanical shutter. A charge accumulation operation of the pixels of each row of the image sensor starts at the end of a reset operation, and ends when the mechanical shutter sets the pixels of each row to a light shield state. The reset operation of the pixels of each row of the image sensor is performed to select rows sequentially in a first direction from an upper surface to a lower surface of a housing. The mechanical shutter ends exposure of the image sensor while causing a shutter curtain to run in the first direction, and a readout operation of the pixels of each row of the image sensor is performed to select rows sequentially in a second direction that is the reverse of the first direction.

4 Claims, 10 Drawing Sheets

FIG. 7  DIR
0 : RESET SCANNING (RUNNING DIRECTION Line 1→ Line n)
1 : READOUT SCANNING (REVERSE DIRECTION Line n→ Line 1)

IMAGE CAPTURING SYSTEM

BACKGROUND OF THE INVENTION

1. Field of the Invention

The present invention relates to an image capturing system.

2. Description of the Related Art

Some digital single-lens reflex cameras perform an image capturing operation using both a focal-plane shutter (to be referred to as a mechanical shutter hereinafter) and an electronic shutter, as disclosed in Japanese Patent Laid-Open No. 11-41523.

In the technique described in Japanese Patent Laid-Open No. 11-41523, the mechanical shutter runs upward. An electromagnet holds, by its attractive force, the mechanical front and rear curtains of the mechanical shutter at the running start position. In many cases, the mechanical shutter runs upward using a spring force. Hence, the running mechanical shutter may receive a load of gravity. Since this makes the running speed of the mechanical shutter unstable, the driving mechanism of the mechanical shutter readily changes over time and causes a deterioration in the operation durability.

To suppress the load due to gravity received by the running mechanical shutter, the image sensing device disclosed in Japanese Patent Laid-Open No. 11-41523 may be inverted to cause the mechanical shutter to run downward. In the technique described in Japanese Patent Laid-Open No. 11-41523, the scanning direction to reset each pixel in the image sensing device is the same as the scanning direction to read out a signal from each pixel. An optical image of an object is formed on the photoelectric conversion element as an image point-symmetrical to the actual object sequentially downward in the pixel array via the lens and mechanical shutter. Hence, pixel signals are read out sequentially downward in the pixel array. Since the captured image is displayed sequentially from the lower to upper parts of the object, it may appear unnatural to the viewer.

SUMMARY OF THE INVENTION

The present invention provides an image capturing system capable of reducing the load due to gravity received by a running mechanical shutter and sequentially reading out image signals from the upper to the lower parts of an object.

According to one aspect of the present invention, there is provided an image capturing system for capturing an optical image of an object via an optical system, comprising: an image sensor having a function of resetting pixels for each row; and a mechanical shutter which is arranged to control an end of exposure of the image sensor. The charge accumulation operation of the pixels of each row of the image sensor starts at the time at which a reset operation ends, and ends at the time when the mechanical shutter sets the pixels of each row to a light-shielded state. The reset operation of the pixels of each row of the image sensor is performed to select rows sequentially in a first direction from an upper surface to a lower surface of a housing, the mechanical shutter ends exposure of the image sensor by causing a shutter curtain to run in the first direction, and a readout operation of the pixels of each row of the image sensor is performed to select rows sequentially in a second direction reverse to the first direction.

According to the present invention, it is possible to reduce the load due to gravity received by a running mechanical shutter and sequentially read out image signals of the upper to lower parts of an object.

Further features of the present invention will become apparent from the following description of exemplary embodiments with reference to the attached drawings.

DESCRIPTION OF THE EMBODIMENTS

Figure 1:
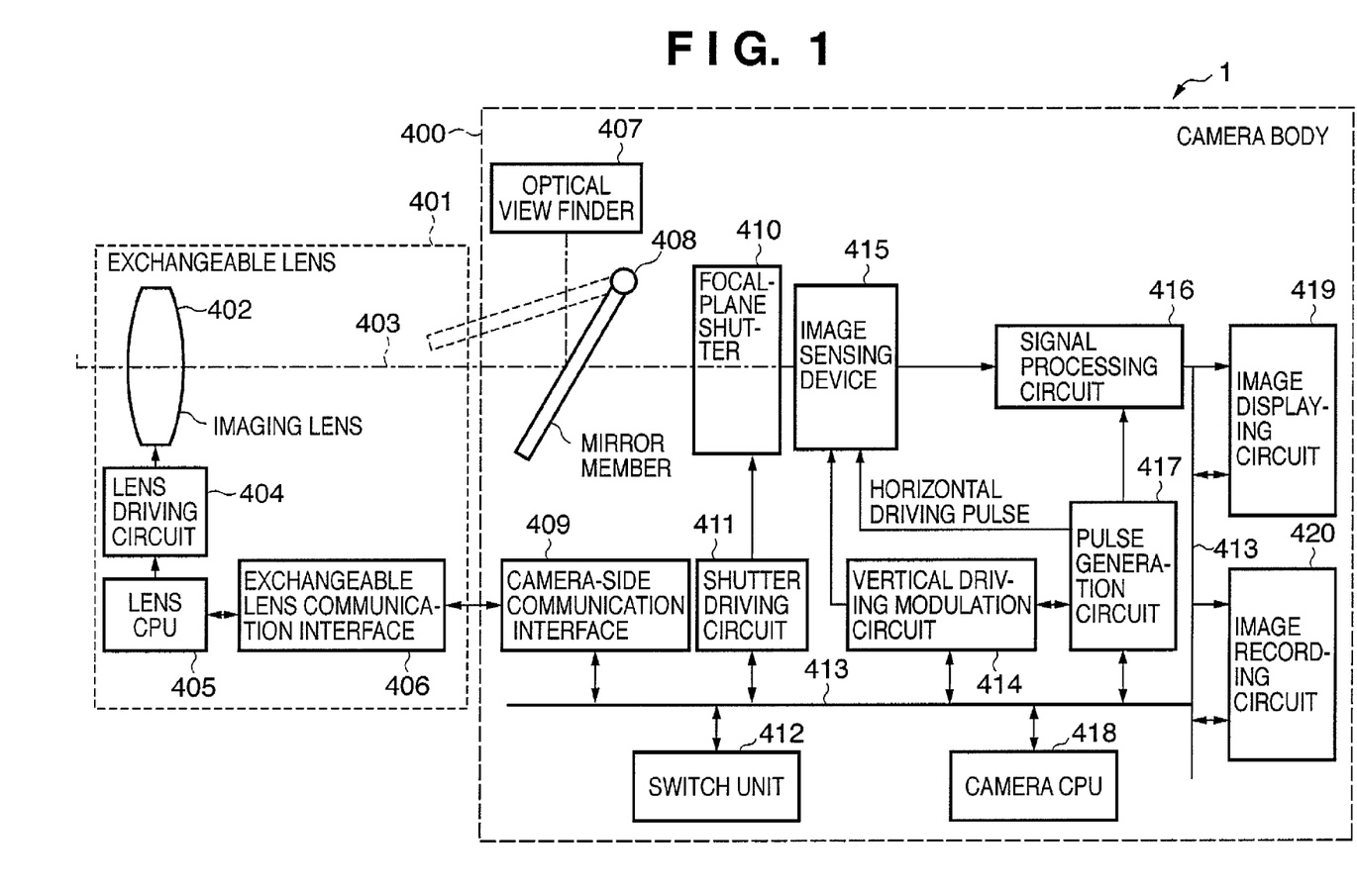
FIG. 1 is a block diagram showing the arrangement of an image capturing system according to the embodiment of the present invention.

The schematic arrangement of an image capturing system 1 according to the embodiment of the present invention will be described with reference to FIG. 1. FIG. 1 is a block diagram showing the arrangement of the image capturing system according to the embodiment of the present invention.

The image capturing system 1 performs an image capturing operation using both a mechanical shutter and an electronic shutter. The image capturing system 1 is, for example, a camera system. The image capturing system 1 includes a camera body 400 and an exchangeable lens 401. The exchangeable lens 401 is detachable from the camera body 400.

The arrangement of the exchangeable lens 401 will be described next.

The exchangeable lens 401 includes an imaging lens (optical system) 402, lens driving circuit 404, a lens CPU 405, and an exchangeable lens communication interface 406.

The imaging lens 402 directs an optical image of an object (not shown), which is point-symmetrical to the actual object, to the camera body 400. The imaging lens 402 is held by a driving mechanism (not shown) and is movable in the direction of an optical axis 403.

The lens driving circuit 404 is connected to the lens CPU 405 and the driving mechanism of the imaging lens 402. The lens driving circuit 404 drives the driving mechanism of the imaging lens 402 under the control of the lens CPU 405.

The lens CPU 405 is connected to the lens driving circuit 404 and the exchangeable lens communication interface 406. The lens CPU 405 can control the lens driving circuit 404 by supplying a control signal to it.

The exchangeable lens communication interface 406 is connected to the lens CPU 405 and the camera body 400. This allows the lens CPU 405 to communicate with the camera body 400 (more specifically, a camera CPU 418 to be described later) via the exchangeable lens communication interface 406.

It should be noted that, in the exchangeable lens 401, instead of one imaging lens 402, a lens unit including a plurality of lenses can direct an optical image of an object to the camera body 400.

The arrangement of the camera body 400 will be described next.

The camera body 400 includes a housing (not shown), a mirror member 408, OVF (Optical View Finder) 407, a focal-plane shutter (to be referred to as a mechanical shutter hereinafter) 410, and bus line 413. The camera body 400 also includes the camera CPU 418, a camera-side communication interface 409, a shutter driving circuit 411, and a pulse generation circuit 417. The camera body 400 also includes a vertical driving modulation circuit 414, an image sensing device (image sensor) 415, a signal processing circuit 416, an image displaying circuit 419, an image recording circuit 420, and a switching unit 412.

The mirror member 408 is arranged between the imaging lens 402, the mechanical shutter 410, and the optical view finder 407. The mirror member 408 is supported to be rotatable about an axis projecting in a direction perpendicular to the optical axis 403. In a non-photographing state (indicated by a solid line), the mirror member 408 crosses the optical axis 403 so as to reflect at least some light components of a light beam which has entered from an object and passed through the imaging lens 402 and direct the light components to the optical view finder 407. In a photographing state (indicated by a broken line), the mirror member 408 retreats from the optical axis 403 so as not to shield the image sensing device 415 from a light beam which has entered from an object and passed through the imaging lens 402. The light beam is directed to the mechanical shutter 410.

The optical view finder 407 is located off the optical axis 403 and is symmetrical to it with respect to the normal of the reflecting surface of the mirror member 408 in the non-photographing state (indicated by the solid line). Hence, a light beam of an object reflected by the mirror member 408 is directed to the optical view finder 407 in the non-photographing state (indicated by the solid line). The optical view finder 407 displays the optical image of the object so that the user can view it.

The mechanical shutter 410 is connected to the shutter driving circuit 411. The mechanical shutter 410 has a mechanical front curtain (shutter curtain) and a mechanical rear curtain (another shutter curtain) each including a plurality of light-shielding blades. The shutter driving circuit 411 drives each of the mechanical front and rear curtains of the mechanical shutter 410 at a predetermined timing to switch between an open state and a closed state. The mechanical shutter 410 is arranged between the imaging lens 402 and the image sensing device 415 on the optical axis 403. In the photographing state (when the mirror member 408 is in the state indicated by the broken line), the mechanical shutter 410 in the open state and directs a light beam of an object to the image sensing device 415. The mechanical shutter 410 in the closed state shields the image sensing device 415 from the light beam of the object so as not to direct it to the image sensing device 415.

The bus line 413 connects the camera CPU 418, the camera-side communication interface 409, the shutter driving circuit 411, the pulse generation circuit 417, the vertical driving modulation circuit 414, the signal processing circuit 416, and the image displaying circuit 419 to each other. The bus line 413 connects the image recording circuit 420 and the switching unit 412 to each other. Hence, these units can internally communicate via the bus line 413.

The camera CPU 418 is connected to these units via the bus line 413. The camera CPU 418 controls the units by supplying a control signal to them via the bus line 413. The camera CPU 418 also receives predetermined information from the units via the bus line 413 and processes or stores the information.

The camera-side communication interface 409 is connected to the bus line 413 and the exchangeable lens 401. The camera CPU 418 can communicate with the lens CPU 405 of the exchangeable lens 401 via the bus line 413 and the camera-side communication interface 409.

The shutter driving circuit 411 is connected to the bus line 413 and the mechanical shutter 410. The shutter driving circuit 411 drives and controls the mechanical shutter 410.

The pulse generation circuit 417 is connected to the bus line 413, the vertical driving modulation circuit 414, and the image sensing device 415. The pulse generation circuit 417 generates scanning clock signals and predetermined control pulses (e.g., horizontal scanning pulse). Of the generated scanning clock signals, the pulse generation circuit 417 supplies a vertical scanning clock signal to the vertical driving modulation circuit 414 and the remaining clock signals to the image sensing device 415. The pulse generation circuit 417 supplies the predetermined control pulses to the image sensing device 415. The pulse generation circuit 417 also outputs a clock signal to the signal processing circuit 416.

The vertical driving modulation circuit 414 is connected to the bus line 413, the pulse generation circuit 417, and the image sensing device 415. The vertical driving modulation circuit 414 modulates the frequency of the clock signal received from the pulse generation circuit 417 into a predetermined frequency and supplies the modulated clock signal to the image sensing device 415.

The image sensing device 415 is connected to the signal processing circuit 416, the pulse generation circuit 417, and the vertical driving modulation circuit 414. The image sensing device 415 includes a plurality of pixels, a vertical scanning circuit (vertical scanning unit), and a horizontal scanning circuit. The vertical scanning circuit receives a predetermined control pulse from the pulse generation circuit 417 and a modulated vertical scanning clock signal from the vertical driving modulation circuit 414. The vertical scanning circuit supplies the vertical scanning clock signal and predetermined control signal (e.g., reset signal) to a plurality of pixels of each row. Each pixel photoelectrically converts an optical image of an object and generates an analog signal in accordance with, for example, the vertical scanning clock signal. In the image sensing device 415, the vertical scanning circuit executes scanning of a reset signal for the pixels so that an electronic shutter operation is performed for each row. The horizontal scanning circuit receives a horizontal scanning clock signal and a predetermined control pulse from the pulse generation circuit 417. Based on the vertical scanning clock signal, the horizontal scanning circuit reads out analog signals from the plurality of pixels and supplies them to the signal processing circuit 416.

The signal processing circuit 416 is connected to the image sensing device 415, the pulse generation circuit 417, and the bus line 413. Based on a clock signal received from the pulse generation circuit 417, the signal processing circuit 416 executes predetermined image processing (e.g., A/D conversion, color processing, and gamma correction) for an analog signal read out from the image sensing device 415. With this processing, the signal processing circuit 416 generates image data (digital signal). The signal processing circuit 416 supplies the image data to the image displaying circuit 419 and the image recording circuit 420 via the bus line 413.

The image displaying circuit 419 is connected to the bus line 413. The image displaying circuit 419 executes EVF (Electric View Finder) processing for the image data received via the bus line 413 and displays the object image on an electronic monitor screen (display unit, not shown). This allows the user to view the object image. The monitor screen functions herein as an EVF.

The image recording circuit 420 is connected to the bus line 413. The image recording circuit 420 executes processing such as encoding for the image data received via the bus line 413 and records it in a predetermined recording medium (not shown). The image recording circuit 420 also reads out data from a predetermined recording medium, executes processing such as decoding for the data, and supplies the processed data to, for example, the image displaying circuit 419 via the bus line 413 in accordance with a predetermined instruction.

The switching unit 412 is connected to the bus line 413. The switching unit 412 includes an interface (switch) to receive a predetermined instruction from the user. For example, the switching unit 412 includes a switch for receiving an instruction to switch between an OVF photographing mode (another operation mode) and the EVF photographing mode. In the OVF photographing mode, an object is optically observed and photographed using the optical view finder 407 and the like. In the EVF photographing mode, an image corresponding to image data is observed on the electronic monitor screen (EVF) and photographed. The switching unit 412 also includes a switch for receiving an instruction to set, for example, a photographing condition, and a switch for receiving an instruction to start a pre-photographing operation and a photographing operation. The switching unit 412 supplies instructions received from the switches to the camera CPU 418 via the bus line 413. The camera CPU 418 executes control corresponding to an instruction input to and supplied from the switching unit 412.

In the above-described image capturing system 1, the electronic shutter (electronic front curtain, reset operation) plays the role of the mechanical front curtain in the focal-plane shutter instead of the mechanical front curtain. Additionally, the image capturing system 1 can execute final photographing (photographing for obtaining a still image) using the mechanical rear curtain in the focal-plane shutter.

A single-lens reflex camera requiring a large image sensing element preferably uses a MOS sensor rather than a CCD sensor. Unlike a progressive scanning CCD sensor (PS-CCD sensor), it is difficult for a MOS sensor to end an accumulation operation at once in all pixels by using the electronic shutter. Hence, the MOS sensor is preferably used together with the mechanical front and rear curtains.

On the other hand, a digital single-lens reflex camera also requires an electronic monitor screen function (EVF function). In this case, it is necessary to use, in the EVF photographing mode, a so-called slit rolling shutter which starts and ends the charge accumulation operation at different timings on the upper and lower parts of the imaging screen.

When the user presses a shutter button (not shown) in the EVF photographing mode, the image capturing system 1 can execute the final photographing operation by using both the electronic shutter and the mechanical shutter 410.

Figure 2:
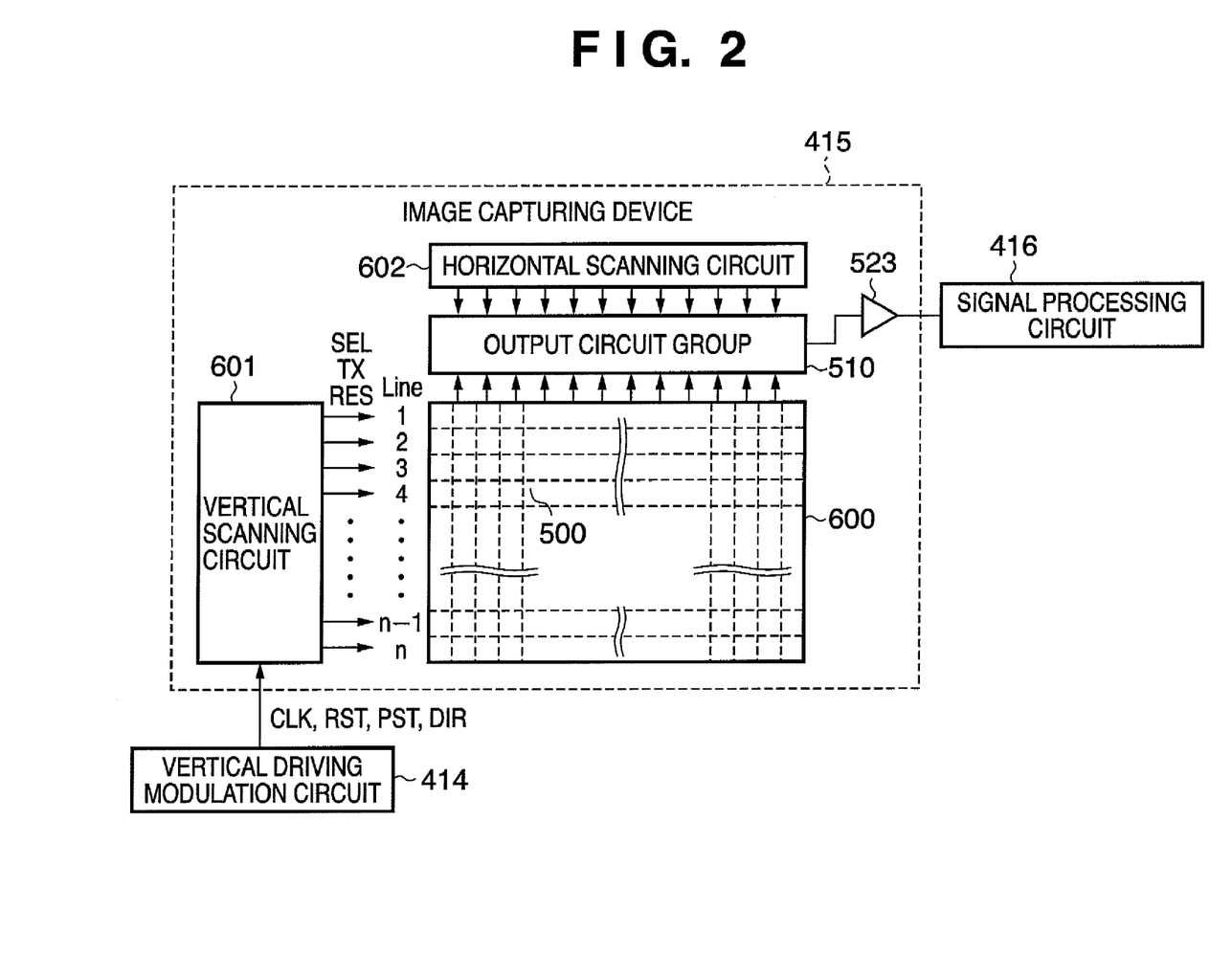
FIG. 2 is a block diagram showing the arrangement of an image sensing device.

The arrangement and operation of the image sensing device (image sensor, CMOS sensor) 415 will be described next with reference to FIG. 2. FIG. 2 is a block diagram showing the arrangement of the image sensing device 415.

The image sensing device 415 includes a plurality of pixels 500, a vertical scanning circuit (vertical shift register) 601, a horizontal scanning circuit (horizontal shift register) 602, an output circuit group 510, and a main AMP 523.

The pixels 500 are two-dimensionally arrayed in the row and column directions in a pixel region 600. The pixel region 600 has, for example, 6,000,000 pixels 500. The pixel region 600 is an open region where an optical image of an object is formed.

The vertical scanning circuit 601 is arranged in the periphery of the pixel region 600. The vertical scanning circuit 601 receives a predetermined control pulse from the pulse generation circuit 417 (FIG. 1) and a modulated vertical scanning clock signal and the like (CLK, RST, PST, and DIR) from the vertical driving modulation circuit 414. A plurality of row signal lines horizontally run from the vertical scanning circuit 601 to the pixels 500. The vertical scanning circuit 601 supplies control signals (e.g., SEL, RES, and TX) to the pixels 500 while vertically scanning them.

The vertical scanning circuit 601 executes scanning of the reset signal RES (to be referred to as reset scanning hereinafter) for the plurality of pixels 500. The vertical scanning circuit 601 also executes scanning of the selection signal (readout signal) SEL (to be referred to as readout scanning hereinafter) for the plurality of pixels 500. The vertical scanning circuit 601 can switch between a mode in which the pixel region 600 is scanned downward and a mode in which the pixel region 600 is scanned upward in accordance with the control signal (DIR) received from the vertical driving modulation circuit 414.

The output circuit group 510 is arranged in the periphery of the pixel region 600. The output circuit group 510 is a group of output circuits 510a provided in correspondence with the respective columns. Each output circuit 510a is connected to a corresponding column signal line. Each output circuit 510a accumulates a noise voltage and a signal voltage received via a corresponding column signal line.

The horizontal scanning circuit 602 is arranged in the periphery of the pixel region 600. A plurality of column selection signal lines vertically run from the horizontal scanning circuit 602 to the output circuit 510a and other output circuits (not shown) of the output circuit group 510. The horizontal scanning circuit 602 sequentially outputs noise voltages and signal voltages accumulated in the output circuits 510a to the main AMP 523 for each column while horizontally scanning the output circuit group 510.

The main AMP 523 differentially amplifies the noise voltage and signal voltage and outputs an image signal (analog signal) to the signal processing circuit 416.

Figure 3:
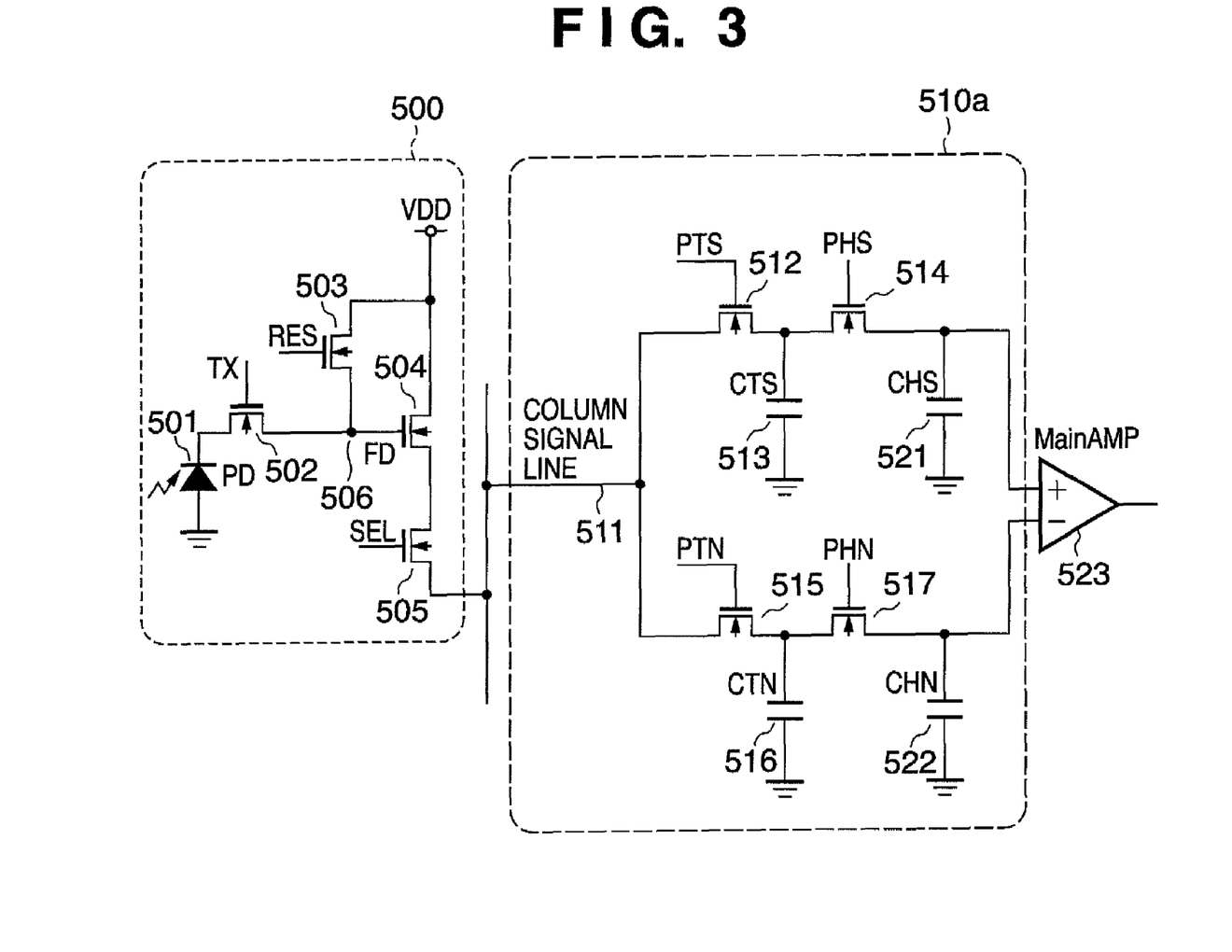
FIG. 3 is a circuit diagram showing the arrangements of a pixel and an output circuit.

The arrangements and operations of the pixel 500 and output circuit 510a will be described next with reference to FIG. 3. FIG. 3 is a circuit diagram showing the arrangements of the pixel 500 and output circuit 510a.

The pixel 500 includes a photodiode (PD) 501, a transfer MOS transistor 502, a floating diffusion (FD) 506, an amplification MOS transistor 504, a selection MOS transistor 505, and a reset MOS transistor 503.

The PD 501 photoelectrically converts received light and accumulates charges in an amount corresponding to the amount of exposure light.

The vertical scanning circuit 601 supplies the transfer signal TX to the gate of the transfer MOS transistor 502. Upon receiving an active transfer signal TX at the gate, the transfer MOS transistor 502 is turned on to transfer the charges accumulated in the PD 501 to the FD 506. On the other hand, upon receiving an nonactive transfer signal TX at the gate, the transfer MOS transistor 502 is turned off so that the PD 501 starts charge accumulation.

The FD 506 holds the transferred charges. The potential of the FD 506 changes from the reset potential in accordance with the amount of transferred changes. The FD 506 inputs a voltage based on the changed potential to the amplification MOS transistor 504. That is, the FD 506 functions as the input portion of the amplification MOS transistor 504.

The amplification MOS transistor 504 receives, at the gate, the voltage based on the potential of the FD 506. The amplification MOS transistor 504 amplifies the received voltage and outputs it to the selection MOS transistor 505. The amplification MOS transistor 504 performs a source follower operation together with the current source and load (not shown) and functions as an amplification circuit.

The vertical scanning circuit 601 supplies the reset signal RES to the gate of the reset MOS transistor 503. Upon receiving an active reset signal RES at the gate, the reset MOS transistor 503 is turned on to reset the charges held in the FD 506. If the transfer MOS transistor 502 is also turned on by an active transfer signal TX supplied to its gate, the reset MOS transistor 503 resets not only the charges in the FD 506 but also those accumulated in the PD 501.

The vertical scanning circuit 601 supplies the selection signal SEL to the gate of the selection MOS transistor 505. Upon receiving an active selection signal SEL at the gate, the selection MOS transistor 505 is turned on to output the voltage received from the amplification MOS transistor 504 to a column signal line 511.

For example, when the PD 501 starts the charge accumulation operation, the FD 506 has the reset potential. At this time, if the vertical scanning circuit 601 activates the selection signal SEL to be supplied to the gate of the selection MOS transistor 505, the selection MOS transistor 505 is turned on. A noise voltage (the voltage of the reset noise level) obtained by causing the amplification MOS transistor 504 to amplify a voltage based on the reset potential of the FD 506 is output to a column signal line 511 (V output line) via the selection MOS transistor 505.

Alternatively, for example, after the elapse of a predetermined time, if the vertical scanning circuit 601 activates the transfer signal TX to be supplied to the transfer MOS transistor 502, the transfer MOS transistor 502 is turned on to transfer the charges accumulated in the PD 501 to the FD 506. After the elapse of a wait time until the readout of the accumulated charges, a signal voltage obtained by causing the amplification MOS transistor 504 to amplify a voltage based on the potential of the FD is output to the column signal line 511 via the selection MOS transistor 505.

The output circuit 510a includes switches 512 and 515, capacitor CTS 513, capacitor CTN 516, readout switches 514 and 517, capacitor CHS 521, and capacitor CHN 522.

When a PTS signal is active, the switch 512 is turned on to accumulate, in the capacitor CTS 513, a signal voltage received via the column signal line 511. When the PTS signal is nonactive, the switch 512 is tuned off to disconnect the column signal line 511 from the capacitor CTS 513.

When a PTN signal is active, the switch 515 is turned on to accumulate, in the capacitor CTN 516, a noise voltage received via the column signal line 511. When the PTN signal is nonactive, the switch 515 is turned off to disconnect the column signal line 511 from the capacitor CTN 516.

When a PHS signal is active, the readout switch 514 is tuned on to temporarily hold, in the capacitor CHS 521, the signal voltage accumulated in the capacitor CTS 513 and output the signal voltage to the main AMP 523. When the PHS signal is nonactive, the readout switch 514 is tuned off to disconnect the capacitor CTS 513 from the capacitor CHS 521.

When a PHN signal is active, the readout switch 517 is turned on to temporarily hold, in the capacitor CHN 522, the noise voltage accumulated in the capacitor CTN 516 and output the noise voltage to the main AMP 523. When the PHN signal is nonactive, the readout switch 517 is turned off to disconnect the capacitor CTN 516 from the capacitor CHN 522.

The main AMP 523 differentially amplifies the noise voltage and signal voltage and outputs an image signal (analog signal) to the signal processing circuit 416.

Figure 4:
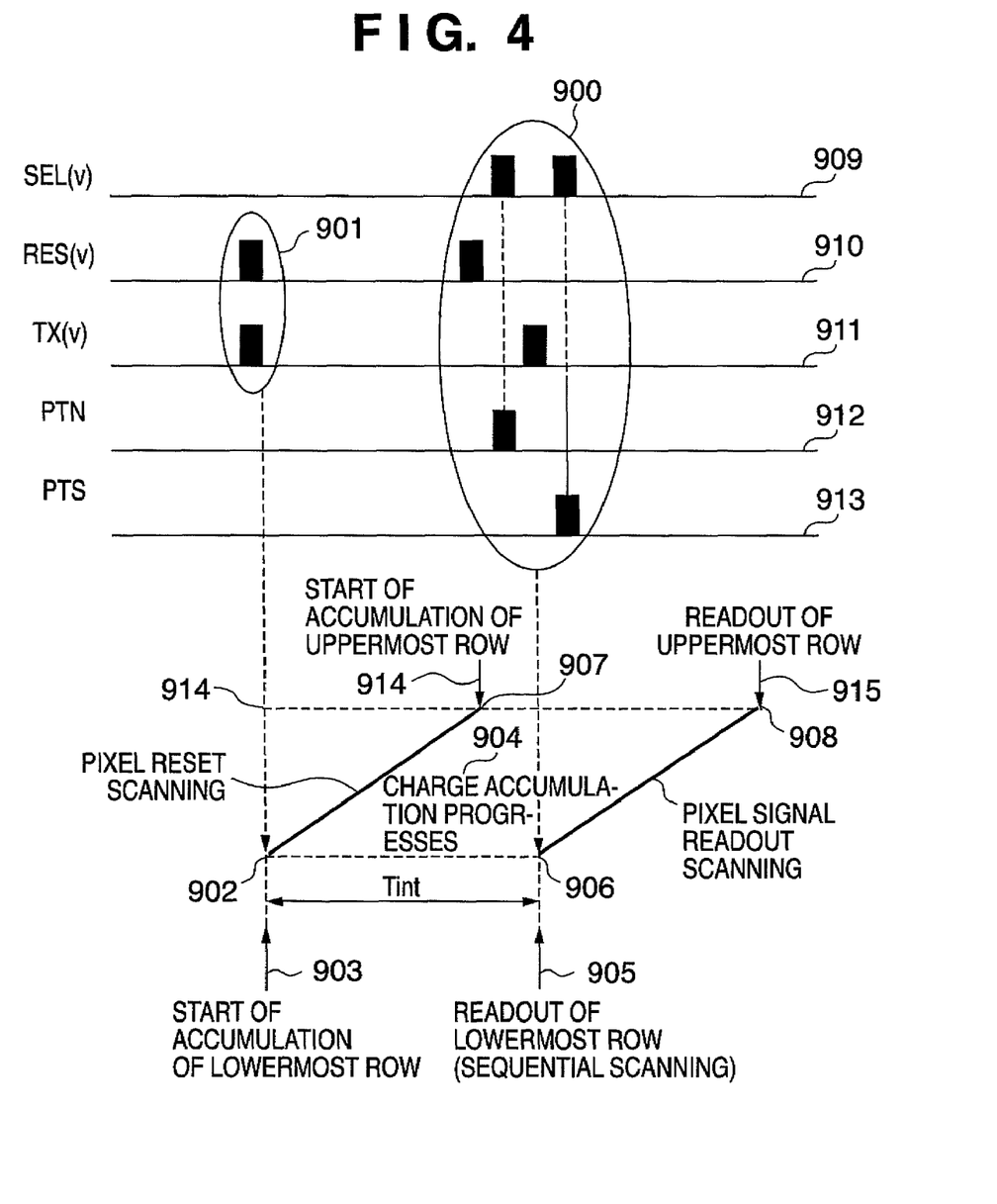
FIG. 4 shows timing and waveform charts showing the operation of the image capturing system.

An operation (rolling operation) of performing reset scanning and readout scanning in the same direction in the image capturing system 1 will be described next with reference to FIG. 4. FIG. 4 shows timing and waveform charts showing the operation of the image capturing system 1.

Referring to FIG. 4, signal waveform lines 909, 910, and 911 indicate the selection signal SEL (v), the reset signal RES (v), and the transfer signal TX (v), respectively. The selection signal SEL (v), the reset signal RES (v), and the transfer signal TX (v) are pulse signals input to the gates of the selection MOS transistor 505, the reset MOS transistor 503, and the transfer MOS transistor 502, respectively, as described above. In FIG. 4, (v) indicates the number (scanning number) of a row in the vertical direction of the image sensing device 415.

Referring to FIG. 4, a parallelogram (parallelogram defined by connecting points 902, 906, 908, and 907) on the lower side indicates the operations of the pixels of the respective rows of the image sensing device 415. For a line indicating reset scanning (line that connects the points 902 and 907) and a line indicating readout scanning (line that connects the points 906 and 908) in FIG. 4, the abscissa represents the timing (time), and the ordinate represents the vertical position in the pixel region 600.

A broken line that connects the points 902 and 906 indicates a row located at the lowermost part (lowermost row) of the pixel region 600 of the image sensing device 415. A broken line that connects points 914, 907, and 908 indicates a row located at the uppermost part (uppermost row) of the pixel region 600 of the image sensing device 415.

At a timing 903, the vertical scanning circuit 601 simultaneously sets the transfer signal TX (911) and the reset signal RES (910) of each pixel of the lowermost row (902, 906) in an ON state 901, and the PD 501 and FD 506 of each pixel included in the lowermost row are reset simultaneously. That is, the vertical scanning circuit 601 starts reset scanning upward from the lowermost row. After the end of reset scanning, the vertical scanning circuit 601 sets the transfer signal TX (911) and the reset signal RES (910) in an OFF state, and the PDs 501 start charge accumulation operation.

The reset scanning is sequentially performed up to the uppermost row (914, 907, 908). The charge accumulation operation starts in all pixels 500 in the pixel region 600. More specifically, at the timing 914, the vertical scanning circuit 601 ends reset scanning of the uppermost row, and the PDs 501 of the uppermost row start charge accumulation operation.

At a timing 905 after the elapse of a predetermined accumulation time Tint from the timing 903, the vertical scanning circuit 601 ends charge accumulation of the lowermost row (902, 906). More specifically, the vertical scanning circuit 601 sets the reset MOS transistors 503 of the lowermost row in the ON state, thereby setting the FDs 506 of the lowermost row at the reset potential (900). Each FD 506 inputs a voltage based on the reset potential to the gate of the corresponding amplification MOS transistor 504. When the vertical scanning circuit 601 sets the selection MOS transistors 505 of the lowermost row and the switches 515 in the ON state, a noise voltage amplified by each amplification MOS transistor 504 is read out to the corresponding column signal line 511 and accumulated in the capacitor CTN 516.

After that, the vertical scanning circuit 601 sets the transfer MOS transistors 502 of the lowermost row in the ON state to transfer the charges in the PDs 501 to the FDs 506 and set the FDs 506 at the signal potential (900). Each FD 506 inputs a voltage based on the signal potential to the gate of the corresponding amplification MOS transistor 504. When the vertical scanning circuit 601 sets the selection MOS transistors 505 of the respective pixels 500 and the switches 515 in the ON state, the signal voltage amplified by each amplification MOS transistor 504 is read out to the corresponding column signal line 511 and accumulated in the capacitor CTS 513.

Additionally, the horizontal scanning circuit 602 scans the output circuit group 510 from, for example, the leftmost column to the rightmost column to sequentially output the noise voltages and signal voltages of the columns to the main AMP 523. The main AMP 523 differentially amplifies the noise voltages and signal voltages of the columns in the lowermost row and sequentially outputs the image signals of the columns in the lowermost row.

In this way, at the timing 905, the vertical scanning circuit 601 starts readout scanning sequentially upward from the lowermost row.

At a timing 915 after the elapse of the predetermined accumulation time Tint from the timing 914, the vertical scanning circuit 601 ends charge accumulation (900) up to the uppermost row (914, 907, 908). More specifically, the vertical scanning circuit 601 sets the reset MOS transistors 503 of the uppermost row in the ON state, thereby setting the FDs 506 of the uppermost row at the reset potential. Each FD 506 inputs a voltage based on the reset potential to the gate of the corresponding amplification MOS transistor 504. When the vertical scanning circuit 601 sets the selection MOS transistors 505 of the uppermost row and sets the switches 515 in the ON state, a noise voltage amplified by each amplification MOS transistor 504 is read out to the corresponding column signal line 511 and accumulated in the capacitor CTN 516.

After that, the vertical scanning circuit 601 sets the transfer MOS transistors 502 of the uppermost row to the ON state to transfer the charges in the PDs 501 to the FDs 506 and set the FDs 506 at the signal potential. Each FD 506 inputs a voltage based on the signal potential to the gate of the corresponding amplification MOS transistor 504. When the vertical scanning circuit 601 sets the selection MOS transistors 505 of the respective pixels 500 and the switches 515 to the ON state, the signal voltage amplified by each amplification MOS transistor 504 is read out to the corresponding column signal line 511 and accumulated in the capacitor CTS 513.

Additionally, the horizontal scanning circuit 602 scans the output circuit group 510 from, for example, the leftmost column to the rightmost column to sequentially output the noise voltages and signal voltages of the columns to the main AMP 523. The main AMP 523 differentially amplifies the noise voltages and signal voltages of the columns in the uppermost row and sequentially outputs the image signals of the columns in the uppermost row.

In this way, at the timing 915, the vertical scanning circuit 601 ends readout scanning up to the uppermost row.

Scanning using the mechanical front curtain is preferably performed simultaneously with reset scanning or before the reset operation (in a region on the left side of the line that connects the points 902 and 907 in FIG. 4) in each pixel 500. Scanning using the mechanical rear curtain is preferably performed simultaneously with readout scanning or after the readout operation (in a region on the right side of the line that connects the points 906 and 908 in FIG. 4) in each pixel 500.

At this time, the predetermined charge accumulation time Tint represents the shutter speed and is constant for the plurality of pixels 500.

The above-described method of controlling the charge accumulation time Tint by reset scanning and readout scanning is called a slit rolling electronic shutter and used for image displaying in the EVF photographing mode of this embodiment.

Figure 5:
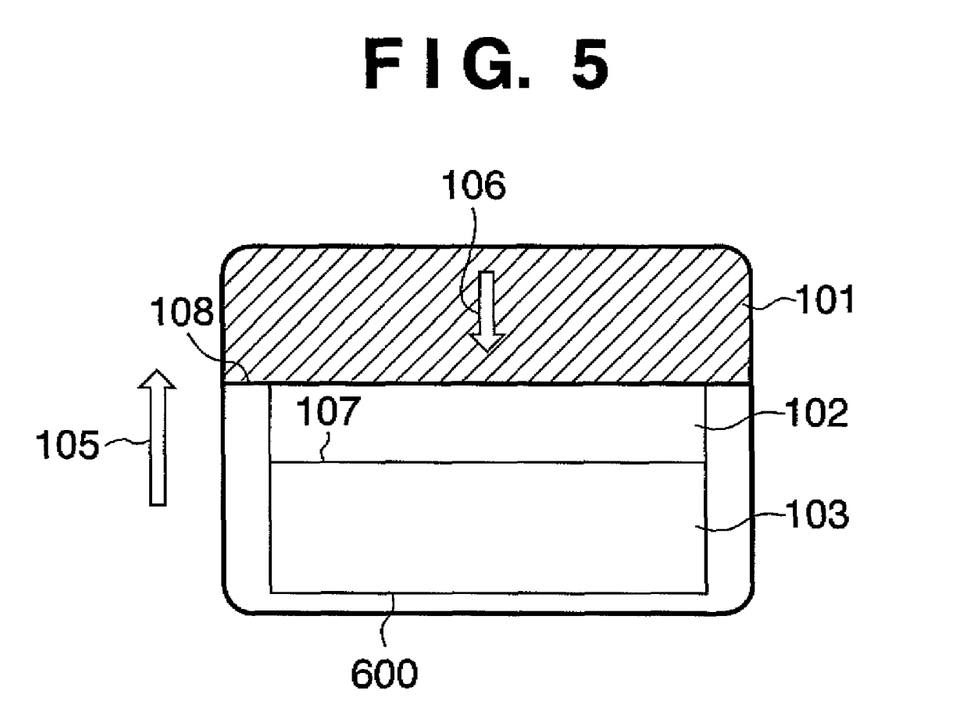
FIG. 5 is a view for explaining a reset scanning direction and a readout scanning direction.

An operation of performing reset scanning and readout scanning in reverse directions in the image capturing system 1 will be described next with reference to FIG. 5. FIG. 5 is a view for explaining a reset scanning direction and a readout scanning direction.

FIG. 5 shows a surface of the image sensing device 415 directed to the imaging lens 402, and the mechanical rear curtain as a part of the mechanical shutter 410. More specifically, the surface of the image sensing device 415 directed to the imaging lens 402 has the pixel region 600. In the pixel region 600, each pixel 500 has an opening corresponding to the PD 501 to receive light. In FIG. 5, the mechanical front curtain (not shown) of the mechanical shutter 410 is completely contracted at the lower region and is closed while a mechanical rear curtain 101 is extended from the top to an front edge position 108 and partially covers the pixel region 600. That is, the mechanical front curtain and mechanical rear curtain 101 of the mechanical shutter 410 run in a direction indicated by an arrow 106 from the upper surface to the lower surface of the housing (first direction). The direction from the upper surface to the lower surface of the housing is the same as a direction in which gravity acts on the image capturing system 1 in a normal posture (posture in photographing). This reduces the load of gravity received by the running mechanical front curtain and the mechanical rear curtain 101.

The vertical scanning circuit 601 executes reset scanning in the direction of the arrow 106 which is the same as the running direction of the mechanical rear curtain 101 (see a row (pixel reset line) 107 that is being reset-scanned). A region 103 below the pixel reset row 107 in the pixel region 600 that is yet to be reset. More specifically, the vertical scanning circuit 601 pseudo-shields the region 103 below an exposure region 102 in the pixel region 600 from light by reset scanning (electronic shutter operation) instead of using the mechanical front curtain. That is, a photoelectric conversion element in a pixel being reset does not accumulate photoelectrically converted charges, so such that this state can be considered to be the same state as the state in which the pixel is being shielded by a mechanical front curtain. The pixel reset row 107 corresponds to the upper end of the mechanical front curtain covering the region 103.

The slit-shaped region 102 between the pixel reset row 107 and the end 108 of the mechanical rear curtain 101 is a region (charge accumulation region) where a charge accumulation operation by exposure is executed. The time after the pixel reset row 107 is passed, that is, the time at which pixel reset operation is completed, until a light-shielded state of the pixels by the mechanical rear curtain 101 is obtained, is the charge accumulation time in which the charge accumulation operation is executed in a specific pixel. As described above, the start timing of the charge accumulation operation changes depending on the row in the pixel region 600. The charge accumulation operation starts earliest in the uppermost row in the pixel region 600 and starts latest in the lowermost row.

On the other hand, the vertical scanning circuit 601 executes readout scanning in a direction (second direction) indicated by an arrow 105 reverse to the running direction (direction of the arrow 106) of the mechanical rear curtain 101 after the mechanical rear curtain 101 extends to the lower end of the pixel region 600 and completely covers it. That is, the vertical scanning circuit 601 executes readout scanning upward. An object image formed in the pixel region 600 is point-symmetrical to the actual object via the imaging lens 402. That is, the image is inverted in the vertical direction. When the vertical scanning circuit 601 executes readout scanning upward sequentially, and the readout operation of the pixels of each row is executed, the object image is read out downward sequentially. The image sensing device 415 sequentially supplies image signals corresponding to the upper to lower parts of the object image to the signal processing circuit 416. Hence, an image which has undergone image processing and EVF processing is displayed on the monitor screen sequentially from the upper to lower parts of the object, and the viewer feels it to be natural. That is, image processing and EVF processing can be done suitably.

Figure 6:
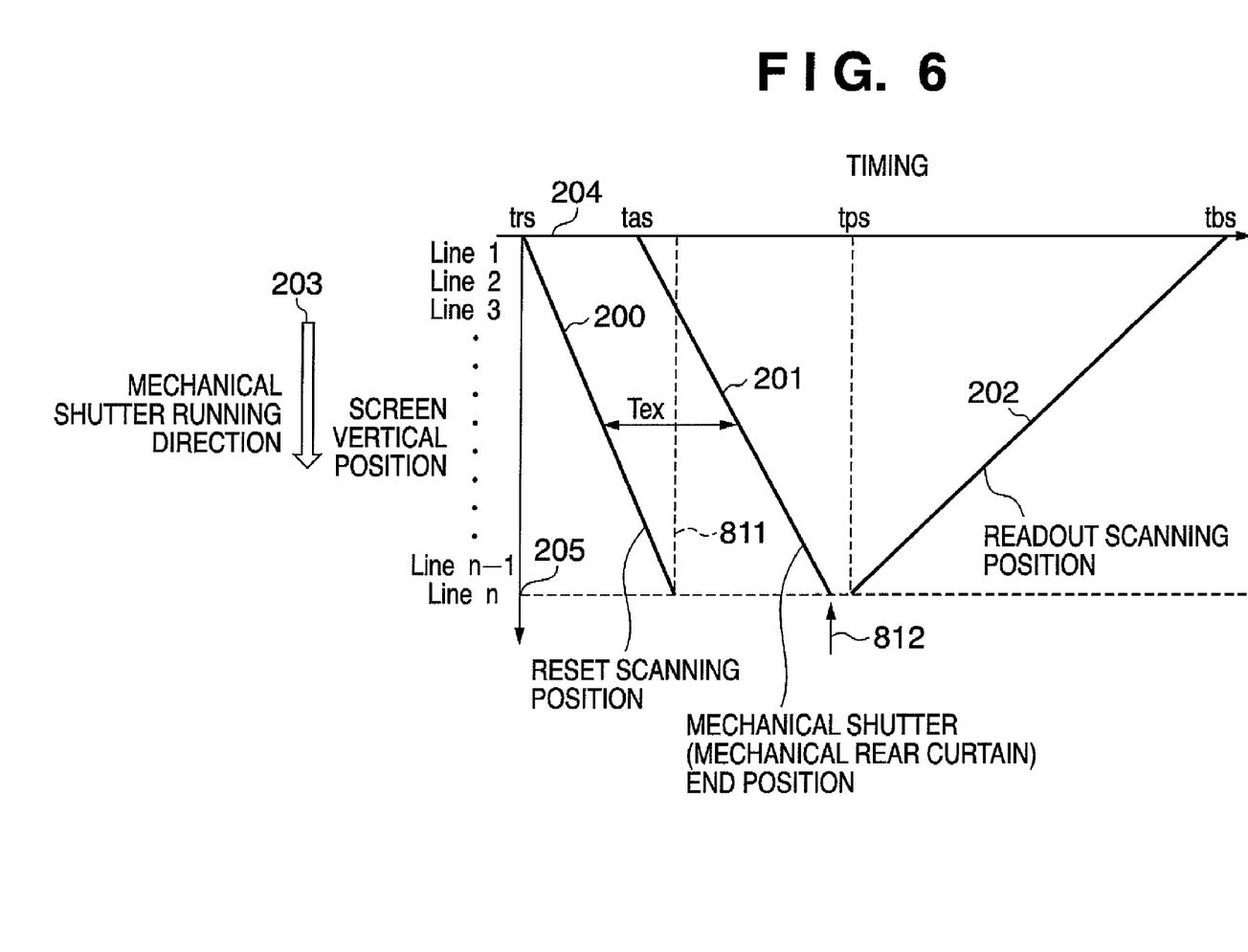
FIG. 6 is a timing chart showing the operation of the image capturing system.

The operation of performing reset scanning and readout scanning in reverse directions in the image capturing system 1 will be described next with reference to FIG. 6. FIG. 6 is a timing chart showing the operation of the image capturing system 1.

For line 200 indicating reset scanning and line 202 indicating readout scanning in FIG. 6, the abscissa represents the timing (time), and the ordinate represents the vertical position (first to nth rows) in the pixel region 600.

A broken line 205 indicates a row located at the lowermost part (lowermost row) of the pixel region 600 of the image sensing device 415. A solid line 204 indicates a row located at the uppermost part (uppermost row) of the pixel region 600 of the image sensing device 415.

At a timing trs, the vertical scanning circuit 601 simultaneously sets the transfer signal TX and the reset signal RES of each pixel of the uppermost row 204 to the ON state, the PDs 501 and FDs 506 of the pixels included in the uppermost row 204 are reset simultaneously. That is, the vertical scanning circuit 601 starts reset scanning from the uppermost row to the lower side. After the end of reset scanning, the vertical scanning circuit 601 sets the transfer signal TX and the reset signal RES to the OFF state so that a charge accumulation operation starts in the PDs 501.

The reset scanning is sequentially executed from the uppermost row to the lowermost row 205, and charge accumulation starts in all pixels 500 in the pixel region 600. More specifically, at a timing 811, the vertical scanning circuit 601 ends reset scanning of the lowermost row 205, and the charge accumulation operation starts in the PDs 501 of the lowermost row 205.

At a timing tas after the elapse of a predetermined charge accumulation time Tex from the timing trs, the mechanical rear curtain 101 (FIG. 5) ends charge accumulation in the uppermost row 204. More specifically, the mechanical rear curtain 101 extends, and the end position 108 reaches a position to cover the uppermost row 204.

At a timing 812 after the elapse of the predetermined charge accumulation time Tex from the timing 811, the mechanical rear curtain 101 ends charge accumulation up to the lowermost row 205. More specifically, the mechanical rear curtain 101 extends, and the end position 108 reaches a position to cover the lowermost row 205. Hence, the mechanical rear curtain 101 covers almost the entire surface of the pixel region 600.

Referring to FIG. 6, a running line 201 of the mechanical rear curtain 101 is indicated by a pseudo-straight line. The actual running line is a curved line because the mechanical rear curtain 101 driven by a spring force runs at an non-constant speed.

At a timing tps after the timing 812, the vertical scanning circuit 601 starts readout scanning in the lowermost row 205. More specifically, the vertical scanning circuit 601 sets the reset MOS transistors 503 of the lowermost row 205 in the ON state, thereby setting the FDs 506 of the lowermost row 205 at the reset potential. Each FD 506 inputs a voltage based on the reset potential to the gate of the corresponding amplification MOS transistor 504. When the vertical scanning circuit 601 sets the selection MOS transistors 505 of the lowermost row 205 and the switches 515 in the ON state, a noise voltage (voltage of reset noise level) amplified by each amplification MOS transistor 504 is read out and accumulated in the capacitor CTN 516.

After that, the vertical scanning circuit 601 sets the transfer MOS transistors 502 of the lowermost row 205 in the ON state to transfer the charges in the PDs 501 to the FDs 506 and sets the FDs 506 at the signal potential. Each FD 506 inputs a voltage based on the signal potential to the gate of the corresponding amplification MOS transistor 504. When the vertical scanning circuit 601 sets the selection MOS transistors 505 of the respective pixels 500 and the switches 515 in the ON state, the signal voltage amplified by each amplification MOS transistor 504 is read out and accumulated in the capacitor CTS 513.

Additionally, the horizontal scanning circuit 602 scans the output circuit group 510 from, for example, the leftmost column to the rightmost column to sequentially output the noise voltages and signal voltages of the columns to the main AMP 523. The main AMP 523 differentially amplifies the noise voltages and signal voltages of the columns in the lowermost row 205 and sequentially outputs the image signals of the columns in the lowermost row 205.

In this way, at the timing tps, the vertical scanning circuit 601 starts readout scanning sequentially from the lowermost row 205 to the upper side.

At a timing tbs, the vertical scanning circuit 601 ends readout scanning up to the uppermost row 204. More specifically, the vertical scanning circuit 601 sets the reset MOS transistors 503 of the uppermost row 204 in the ON state, thereby setting the FDs 506 of the uppermost row 204 at the reset potential. Each FD 506 inputs a voltage based on the reset potential to the gate of the corresponding amplification MOS transistor 504. When the vertical scanning circuit 601 sets the selection MOS transistors 505 of the uppermost row 204 and the switches 515 to the ON state, a noise voltage (voltage of reset noise level) amplified by each amplification MOS transistor 504 is read out and accumulated in the capacitor CTN 516.

After that, the vertical scanning circuit 601 sets the transfer MOS transistors 502 of the uppermost row 204 to the ON state to transfer the charges in the PDs 501 to the FDs 506 and sets the FDs 506 at the signal potential. Each FD 506 inputs a voltage based on the signal potential to the gate of the corresponding amplification MOS transistor 504. When the vertical scanning circuit 601 sets the selection MOS transistors 505 of the respective pixels 500 and the switches 515 in the ON state, the signal voltage amplified by each amplification MOS transistor 504 is read out and accumulated in the capacitor CTS 513.

Additionally, the horizontal scanning circuit 602 scans the output circuit group 510 from, for example, the leftmost column to the rightmost column to sequentially output the noise voltages and signal voltages of the columns to the main AMP 523. The main AMP 523 differentially amplifies the noise voltages and the signal voltages of the columns in the uppermost row 204 and sequentially outputs the image signals of the columns in the uppermost row 204.

In this way, at the timing tbs, the vertical scanning circuit 601 ends readout scanning up to the uppermost row 204.

Scanning using the mechanical front curtain is preferably performed simultaneously with reset scanning or before the reset operation (in a region on the left side of the line 200 in FIG. 6) in each pixel 500. At this time, the predetermined charge accumulation time Tex represents the shutter speed and is constant for the plurality of pixels 500.

The charge accumulation time Tex is controlled in the above-described way by reset scanning and running of the mechanical rear curtain.

Figure 7:
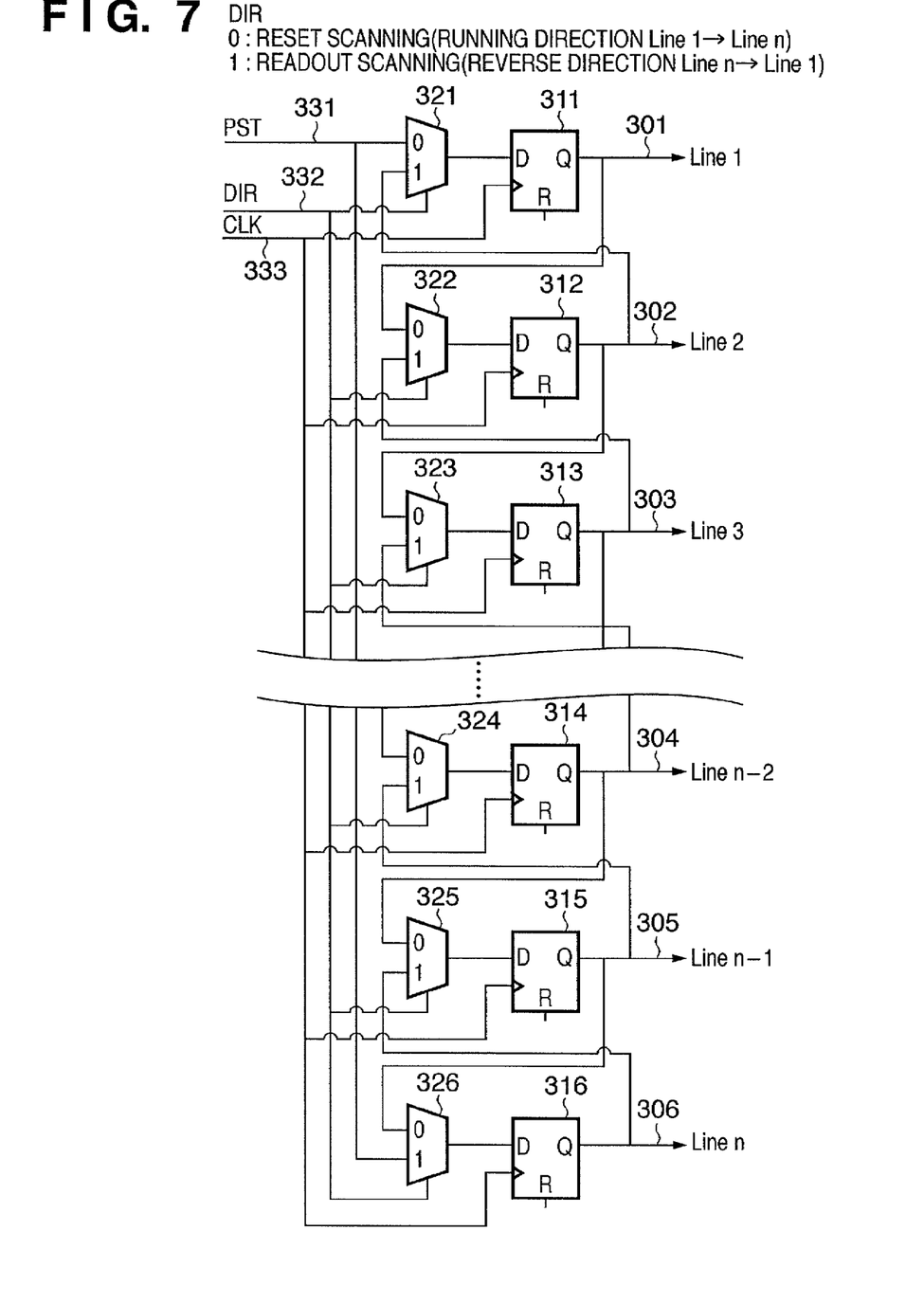
FIG. 7 is a circuit diagram showing the arrangement of a vertical scanning circuit.

The circuit arrangement of the vertical scanning circuit (vertical shift register) 601 will be described next with reference to FIG. 7. FIG. 7 is a circuit diagram showing the arrangement of the vertical scanning circuit 601.

Referring to FIG. 7, a scanning start pulse (to be referred to as PST hereinafter) 331 is the start pulse signal of the vertical scanning circuit 601 of this embodiment. Line 1 to Line n (signals 301 to 306) represent the row selection numbers of the uppermost row (first row) to the lowermost row (nth row) in the pixel region 600 of the image sensing device 415. A DIR signal 332 switches the scanning direction of the start pulse signal 331 of the vertical scanning circuit 601 of this embodiment. When the DIR signal 332 is "0", the PST signal 331 sequentially selects and scans from the uppermost row (first row) to the lowermost row (nth row) in the pixel region 600 of the image sensing device 415. When the DIR signal 332 is "1", the PST signal 331 sequentially selects and scans from the lowermost row (nth row) to the uppermost row (first row) in the pixel region 600 of the image sensing device 415. In this embodiment, the initial value of the DIR signal 332 is "1" (the direction to scan from the lowermost row to the uppermost row). Upon shutter-on in the EVF photographing mode, the DIR signal 332 is immediately set to "0" (the same direction as the running direction of the mechanical shutter 410).

As shown in FIG. 7, in the vertical scanning circuit 601, when the DIR signal 332 is "0", and the PST signal 331 is input, the row selection signals 301 to 306 are activated in the order of Line 1 to Line n at the leading edge of a CLK 333. More specifically, when the DIR signal 332 is "0", the uppermost row (Line 1) to the lowermost row (Line n) in the pixel region 600 of the image sensing device 415 are sequentially selected and scanned.

In the vertical scanning circuit 601, when the DIR signal 332 is "1", and the PST signal 331 is input, the row selection signals 301 to 306 are activated in the order of Line n to Line 1 at the leading edge of the CLK 333. More specifically, when the DIR signal 332 is "1", the lowermost row (Line n) to the uppermost row (Line 1) in the pixel region 600 of the image sensing device 415 are sequentially selected and scanned.

In the image sensing device 415, the selected row selection signals Line 1 to Line n (301 to 306) and the control signals (e.g., SEL, RES, and TX) to be supplied to each pixel 500 are connected by an AND circuit and the like, although these are not illustrated. Each MOS transistor is activated at a predetermined timing in each row selected and scanned by the vertical scanning circuit 601.

Figure 8A:
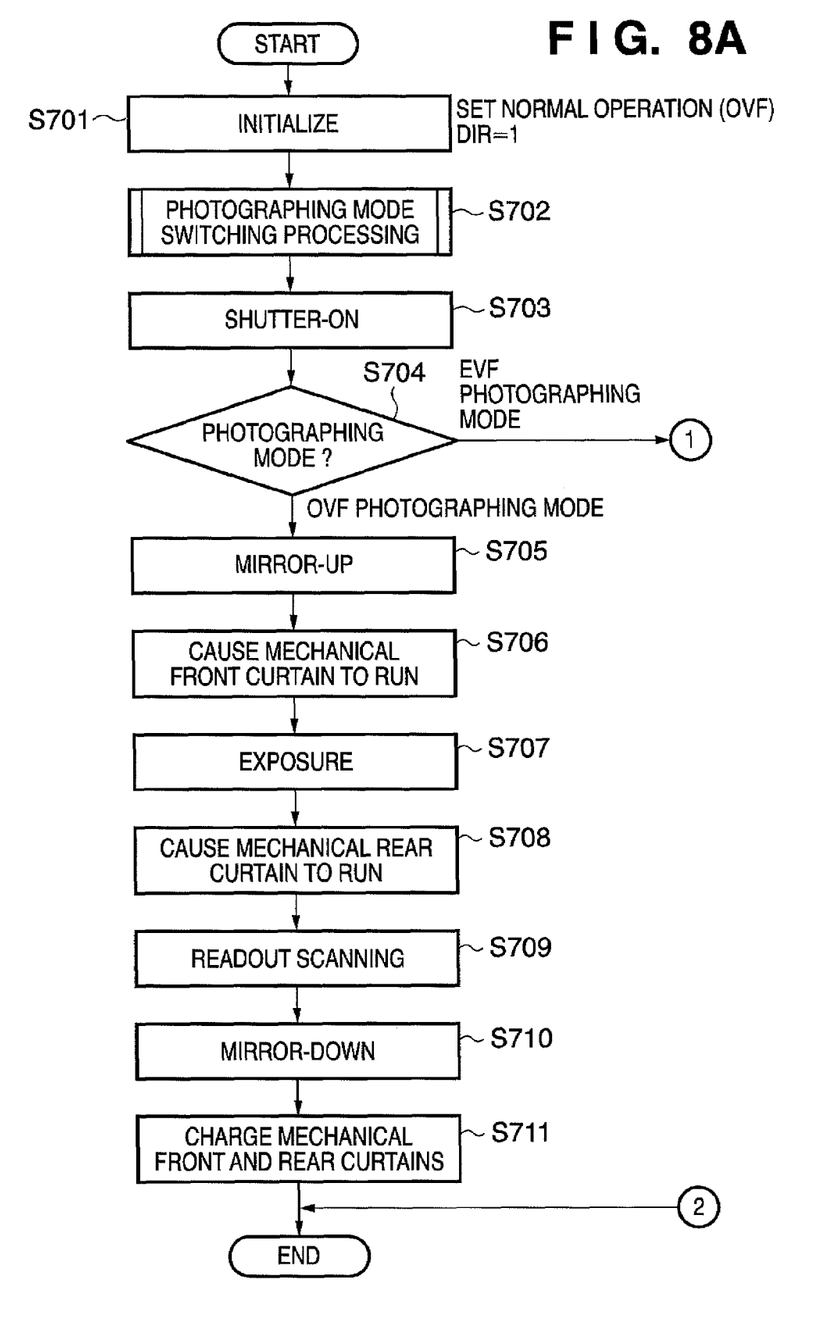
FIGS. 8A and 8B are flowcharts illustrating the sequence of processing of causing the image capturing system to capture an image of an object.
Figure 8B:
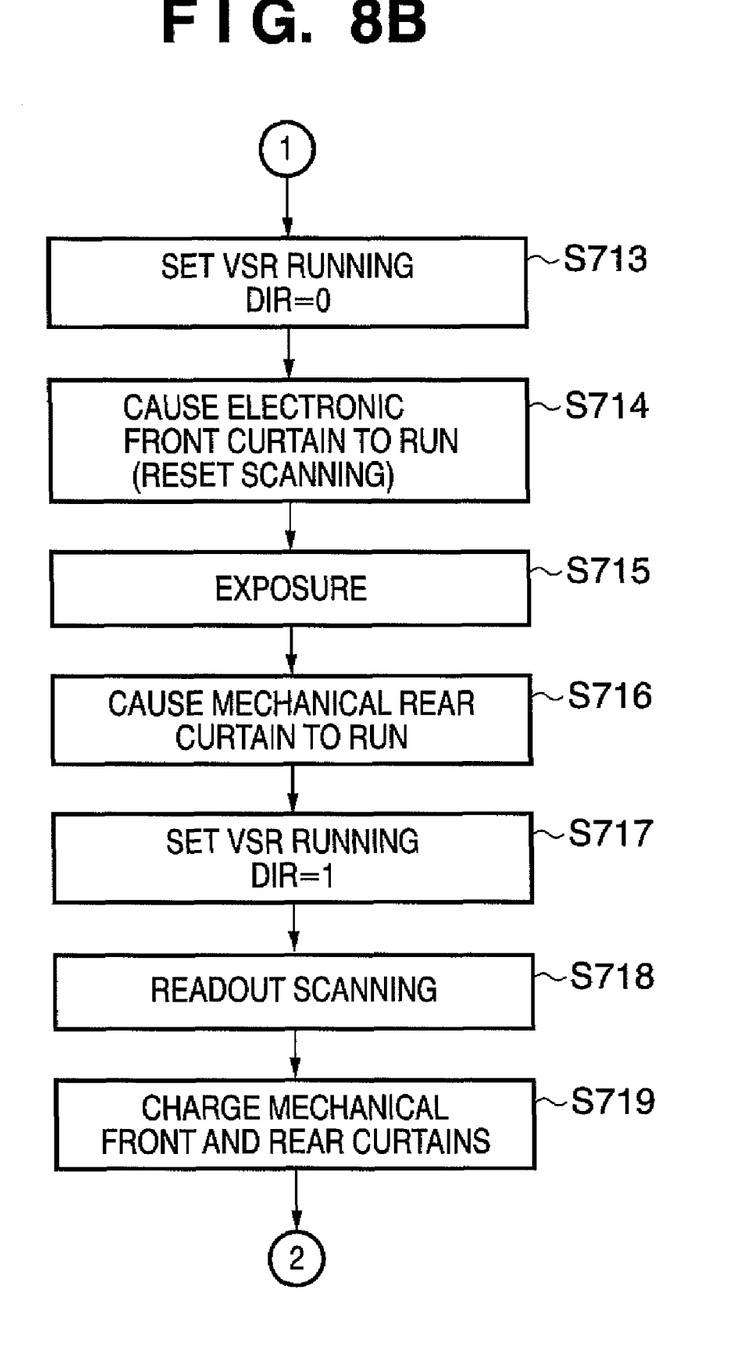

The sequence of processing of causing the image capturing system 1 to capture an image of an object will be described next with reference to FIGS. 8A and 8B. FIGS. 8A and 8B are flowcharts illustrating the sequence of processing of causing the image capturing system 1 to capture an image of an object.

In step S701, the switching unit 412 receives a power-on instruction from the user. The camera CPU 418 receives the information of the instruction via the bus line 413. Based on the instruction, the camera CPU 418 controls the initial operation and executes predetermined initialization. The camera CPU 418 executes initialization optimum for, for example, the OVF photographing mode. The camera CPU 418 sets, for example, the DIR signal 332 of the vertical scanning circuit 601 to "1" and turns off the EVF and the image displaying circuit 419.

In step S702, photographing mode switching processing is executed. The photographing mode switching processing will be described later in detail.

In step S703, the switching unit 412 receives a shutter-on instruction from the user. The camera CPU 418 receives the information of the instruction via the bus line 413.

In step S704, the camera CPU 418 determines the current photographing mode based on the shutter-on instruction. If the camera CPU 418 determines that the current photographing mode is the OVF photographing mode, the process advances to step S705. If the camera CPU 418 determines that the current photographing mode is the EVF photographing mode, the process advances to step S713.

In step S705, based on the shutter-on instruction, the camera CPU 418 drives and moves the mirror member 408 from the position of the non-photographing state (indicated by the solid line in FIG. 1) to the position of the photographing state (indicated by the broken line in FIG. 1). That is, the mirror member 408 retreats from the optical axis 403 (mirror-up state).

In step S706, based on the shutter-on instruction, the camera CPU 418 generates a shutter operation start command and supplies it to the shutter driving circuit 411 via the bus line 413. The shutter driving circuit 411 causes the mechanical front curtain of the mechanical shutter 410 to run downward in accordance with the shutter operation start command. This cancels, sequentially downward, the light-shielded state of the pixel region 600 of the image sensing device 415 covered by the mechanical front curtain.

In step S707, the mechanical front curtain of the mechanical shutter 410 contracts downward, and exposure of the pixel region 600 of the image sensing device 415 starts from above.

In step S708, the shutter driving circuit 411 determines by referring to a timer (not shown) whether the predetermined charge accumulation time Tint has elapsed from the start of running of the mechanical front curtain. If it is determined that the predetermined charge accumulation time Tint has not elapsed, the shutter driving circuit 411 maintains a waiting state. If it is determined that the predetermined charge accumulation time Tint has elapsed, the shutter driving circuit 411 causes the mechanical rear curtain 101 to run downward. Hence, the slit-shaped exposure region moves downward in the pixel region 600 of the image sensing device 415.

In step S709, the camera CPU 418 receives, from the shutter driving circuit 411 via the bus line 413, information representing that the mechanical front and rear curtains have run up to the lowermost row. The camera CPU 418 drives the pulse generation circuit 417 and vertical driving modulation circuit 414 based on the information so that the vertical scanning circuit 601 of the image sensing device 415 executes readout scanning of the pixel region 600 from above downward.

In step S710, the camera CPU 418 receives, from the image sensing device 415 via the bus line 413, information representing that the vertical scanning circuit 601 has ended readout scanning up to the lowermost row. Based on the information representing the end of readout scanning, the camera CPU 418 drives and moves the mirror member 408 from the position of the photographing state (indicated by the broken line in FIG. 1) to the position of the non-photographing state (indicated by the solid line in FIG. 1). That is, the mirror member 408 crosses the optical axis 403 (mirror-down state).

In step S711, the camera CPU 418 supplies a control signal for charging to the shutter driving circuit 411 via the bus line 413. Based on the control signal, the shutter driving circuit 411 charges the mechanical front and rear curtains of the mechanical shutter 410.

In the above-described way, the normal photographing operation using the optical view finder 407 is performed in steps S705 to S711.

In step S713, based on the shutter-on instruction, the camera CPU 418 controls the vertical driving modulation circuit 414 to set the DIR signal 332 (e.g., to "0") such that it indicates scanning downward. The vertical driving modulation circuit 414 supplies the DIR signal 332 (e.g., "0") to the vertical scanning circuit 601 of the image sensing device 415.

In step S714, the camera CPU 418 receives, from the shutter driving circuit 411 via the bus line 413, information representing that the mechanical front curtain has reached the lowermost row. Based on the information and the DIR signal 332, the camera CPU 418 controls the pulse generation circuit 417 and vertical driving modulation circuit 414 such that the vertical scanning circuit 601 of the image sensing device 415 executes reset scanning downward (causes the electronic front curtain to run).

In step S715, the vertical scanning circuit 601 of the image sensing device 415 executes reset scanning of the pixel region 600 downward. The charge accumulation operation starts from the upper side of the pixel region 600 of the image sensing device 415. Hence, actual exposure starts from the upper side of the pixel region 600 of the image sensing device 415.

In step S716, the shutter driving circuit 411 determines by referring to a timer (not shown) whether the predetermined charge accumulation time Tex has elapsed from the start of reset scanning by the vertical scanning circuit 601. If it is determined that the predetermined charge accumulation time Tex has not elapsed, the shutter driving circuit 411 maintains a waiting state. If it is determined that the predetermined charge accumulation time Tex has elapsed, the shutter driving circuit 411 causes the mechanical rear curtain 101 to run from above downward. Hence, the slit-shaped region 102 (FIG. 5) moves from above downward in the pixel region 600 of the image sensing device 415.

In step S717, the camera CPU 418 receives, from the shutter driving circuit 411 via the bus line 413, information representing that the mechanical rear curtain 101 has run up to the lowermost row. The camera CPU 418 controls the vertical driving modulation circuit 414 based on the information to set the DIR signal 332 (e.g., to "1") such that it indicates scanning from below upward. The vertical driving modulation circuit 414 supplies the DIR signal 332 (e.g., "1") to the vertical scanning circuit 601 of the image sensing device 415.

In step S718, the camera CPU 418 controls the pulse generation circuit 417 and the vertical driving modulation circuit 414 on the basis of the DIR signal 332 and the like so that the vertical scanning circuit 601 of the image sensing device 415 executes readout scanning of the pixel region 600 from below upward.

In step S719, the camera CPU 418 supplies a control signal for charging to the shutter driving circuit 411 via the bus line 413. Based on the control signal, the shutter driving circuit 411 charges the mechanical front and rear curtains of the mechanical shutter 410.

In the above-described way, the photographing operation using the electronic monitor screen (EVF) is performed in steps S713 to S719.

Figure 9:
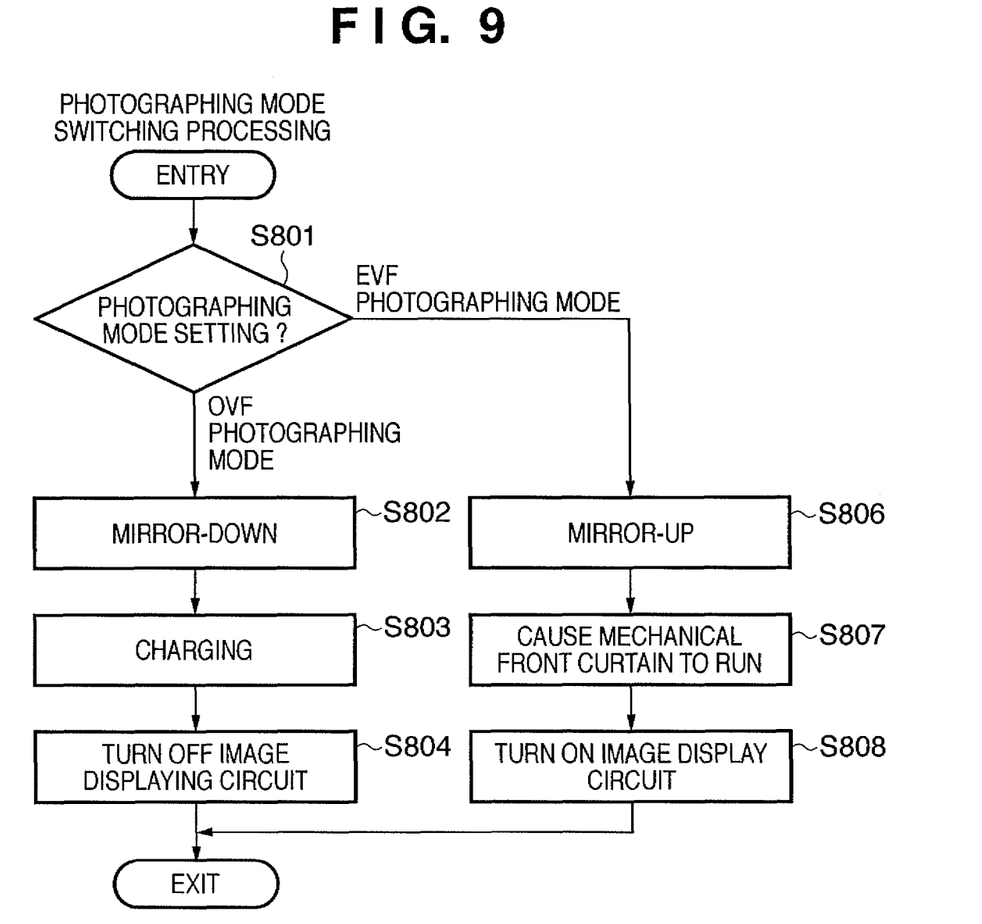
FIG. 9 is a flowchart illustrating the sequence of photographing mode switching processing.

The sequence of photographing mode switching processing will be described next with reference to FIG. 9. FIG. 9 is a flowchart illustrating the sequence of photographing mode switching processing.

In step S801, the switching unit 412 receives an instruction to set a photographing mode. The camera CPU 418 receives the information of the instruction via the bus line 413. If the camera CPU 418 determines that the photographing mode is set to the OVF photographing mode, the process advances to step S802. If the camera CPU 418 determines that the photographing mode is set to the EVF photographing mode, the process advances to step S806.

In step S802, the camera CPU 418 receives, from the switching unit 412 via the bus line 413, information representing that the photographing mode is set to the OVF photographing mode. Based on the information, the camera CPU 418 drives and moves the mirror member 408 from the position of the photographing state (indicated by the broken line in FIG. 1) to the position of the non-photographing state (indicated by the solid line in FIG. 1). That is, the mirror member 408 crosses the optical axis 403 (mirror-down state). Hence, a light beam representing an object image is reflected by the mirror member 408 and directed by the optical view finder 407 so that the user can view the optical image of the object via the optical view finder 407.

In step S803, the camera CPU 418 supplies a control signal for charging to the shutter driving circuit 411 via the bus line 413. Based on the control signal, the shutter driving circuit 411 charges the mechanical front and rear curtains of the mechanical shutter 410.

In step S804, the camera CPU 418 turns off the image displaying circuit 419 and the electronic monitor screen (EVF) via the bus line 413.

In step S806, the camera CPU 418 receives, from the switching unit 412 via the bus line 413, information representing that the photographing mode is set to the EVF photographing mode. Based on the information, the camera CPU 418 drives and moves the mirror member 408 from the position of the non-photographing state (indicated by the solid line in FIG. 1) to the position of the photographing state (indicated by the broken line in FIG. 1). That is, the mirror member 408 retreats from the optical axis 403 (mirror-up state).

In step S807, based on the information representing that the photographing mode is set to the EVF photographing mode, the camera CPU 418 generates a mechanical front curtain running start command and supplies it to the shutter driving circuit 411 via the bus line 413. The shutter driving circuit 411 causes the mechanical front curtain of the mechanical shutter 410 to run from above downward in accordance with the mechanical front curtain running start command.

In step S808, the camera CPU 418 turns on the image displaying circuit 419 and the electronic monitor screen (EVF) via the bus line 413. The image capturing system 1 executes the rolling operation shown in FIG. 4.

On the other hand, the image sensing device 415 supplies an image signal corresponding to the optical image of the object to the signal processing circuit 416. The signal processing circuit 416 processes the received image signal and outputs the image data to the image displaying circuit 419. The image displaying circuit 419 displays an image corresponding to the image data on the electronic monitor screen (EVF). Hence, the user can view the optical image of the object via the electronic monitor screen (EVF).

As described above, according to the image capturing system 1 of this embodiment, the mirror member 408 already retreats from the optical axis 403 when the above-described final photographing operation starts in the EVF photographing mode. Additionally, the mechanical front curtain is open. It is therefore possible to immediately execute the final photographing operation in accordance with the operation of the shutter button.

According to the image capturing system of this embodiment, the mechanical shutter 410 runs in a direction not to receive a load of gravity in a normal posture. This allows the image capturing system to obtain a stable running curve for the mechanical shutter and to provide advantages in changes over time and operation durability.

According to the image capturing system of this embodiment, signals in accordance with accumulated charges are always read out from the upper side of a captured image (from the lowermost row of the pixel region 600). Hence, the image signals of the upper to lower parts of an object can sequentially be read out. It is therefore possible to execute suitable image processing and EVF processing.

Since the photographing operation is performed using both the mechanical shutter and the electronic shutter, it is possible to reduce the load of gravity on the mechanical shutter and sequentially read out image signals of the upper to lower parts of an object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-056368, filed Mar. 6, 2007, which is hereby incorporated by reference herein in its entirety.

What is claimed is:

1. An image capturing system including an image sensor configured to capture an optical image of an object, which image is formed by an optical system and is point symmetrical to the object, the image capturing system comprising:
   a housing having an upper surface and a lower surface;
   a mechanical shutter which is arranged to control an end of exposure of said image sensor; and
   an image displaying unit,
   wherein in a first operation mode, a charge accumulation operation of the pixels of each row of said image sensor starts at a time at which a reset operation of the pixels of each row ends, and ends at a time at which said mechanical shutter sets the pixels of each row to a light-shielded state,
   wherein the reset operation of the pixels of each row of said image sensor is performed by sequentially selecting rows in a first direction from the upper surface to the lower surface, and said mechanical shutter is set to a state in which said image sensor is exposed to light, before the starting of the charge accumulation operation,
   wherein said mechanical shutter sequentially ends exposure of the pixels of each row of said image sensor in the first direction,
   wherein a readout operation of the pixels of each row of said image sensor starts after said mechanical shutter sets the pixels of a lowermost row of said image sensor in the light-shielded state, the readout operation being performed while selecting rows sequentially in a second direction that is the reverse of the first direction,
   wherein said image displaying unit sequentially displays rows that form an image of an object, in a non-inverted state, in accordance with the signals sequentially output from said image sensor through the sequential selection of the rows in the second direction,
   wherein said image sensor comprises a vertical scanning unit adapted to scan the pixels of each row,
   wherein the reset operation of the pixels of each row of the image sensor is performed by causing said vertical scanning unit to select rows sequentially in the first direction and supplying a reset signal, and
   wherein the readout operation of the pixels of each row of said image sensor is performed by causing said vertical scanning unit to select rows sequentially in the second direction and supplying a readout signal,
   wherein said mechanical shutter sets the pixels of an uppermost row of said image sensor in the light-shielded state before the reset operation of the pixels of the lowermost row of said image sensor is performed,
   wherein there is a delay between said mechanical shutter setting the pixels of the lowermost row of said image sensor in the light-shielded state, and the readout operation being performed, and
   wherein a time between the reset operation of the pixels of a row and the readout operation of the pixels of that row is greater for the uppermost row of said image sensor than for the lowermost row of said image sensor.

2. A system according to claim 1, wherein said mechanical shutter comprises first and second shutter curtains, said first shutter curtain being used for controlling the start of exposure of said image sensor in a second operation mode,
   wherein the charge accumulation operation of the pixels of each row of said image sensor in the second operation mode starts at the time at which the light-shielded state is canceled by said first shutter curtain, and ends at the time at which said second shutter curtain sets the light-shielded state, and
   wherein in the second operation mode, said mechanical shutter starts exposure of said image sensor by canceling the light-shielded state by causing said first shutter curtain to run in the first direction, and ends exposure of said image sensor by causing said second shutter curtain to run in the first direction.

3. A system according to claim 1, wherein the readout operation corresponds to the reset operation.

4. The system according to claim 1, wherein said vertical scanning circuit comprises a plurality of circuits respectively corresponding to the rows of said image sensor,
   wherein said circuits receive, in parallel, a signal that controls a direction of sequential selection of the rows,
   wherein when the signal received in parallel by said circuits has a first value, then said circuits bring about sequential selection of rows in the first direction, and
   wherein when the signal received in parallel by said circuits has a second value different from the first value, then said circuits bring about sequential selection of rows in the second direction.

* * * * *